US010373288B2

(12) United States Patent
Yang et al.

(10) Patent No.: US 10,373,288 B2
(45) Date of Patent: Aug. 6, 2019

(54) TRANSPOSE OF IMAGE DATA BETWEEN A LINEAR AND A Y-TILED STORAGE FORMAT

(71) Applicant: INTEL CORPORATION, Santa Clara, CA (US)

(72) Inventors: Yuting Yang, Sunnyvale, CA (US); Guei-Yuan Lueh, San Jose, CA (US); Lei Shen, Shanghai (CN); John R. Hartwig, Sunnyvale, CA (US); Kin-Hang Cheung, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/487,815

(22) Filed: Apr. 14, 2017

(65) Prior Publication Data

US 2017/0221178 A1 Aug. 3, 2017

Related U.S. Application Data

(63) Continuation of application No. 13/977,200, filed as application No. PCT/CN2011/084898 on Dec. 29, 2011, now Pat. No. 9,659,343.

(51) Int. Cl.

| | |
|---|---|
| ***G06T 1/60*** | (2006.01) |
| ***G06F 3/14*** | (2006.01) |
| ***H04N 5/76*** | (2006.01) |
| ***G09G 5/36*** | (2006.01) |
| ***G09G 5/397*** | (2006.01) |

(52) U.S. Cl.

CPC .................. *G06T 1/60* (2013.01); *G06F 3/14* (2013.01); *G09G 5/363* (2013.01); *G09G 5/397* (2013.01); *H04N 5/76* (2013.01); *G09G 2354/00* (2013.01); *G09G 2360/121* (2013.01); *G09G 2370/12* (2013.01)

(58) Field of Classification Search

None

See application file for complete search history.

(56) References Cited

U.S. PATENT DOCUMENTS 5,828,382 A * 10/1998 Wilde ..................... G06T 15/04 345/552
5,990,912 A * 11/1999 Swanson ............ G06F 12/0207 345/531
6,018,332 A * 1/2000 Nason ....................... G06F 3/14 345/661

(Continued)

FOREIGN PATENT DOCUMENTS

CN 1955968 A 5/2007
CN 101183374 A 5/2008
WO 2013097137 A1 7/2013

OTHER PUBLICATIONS

International Search Report and Written Opinion for International Patent Application No. PCT/CN2011/084898, dated Oct. 18, 2012, 11 pages.

(Continued)

*Primary Examiner* — Xiao M Wu
*Assistant Examiner* — Steven Z Elbinger
(74) *Attorney, Agent, or Firm* — Jordan IP Law, LLC

(57) ABSTRACT

Systems, apparatus, articles, and methods are described including operations to transpose image data between a linear-type storage format and a Y-tiled-type storage format.

25 Claims, 8 Drawing Sheets

(56) References Cited

U.S. PATENT DOCUMENTS

| | | | | |
|---|---|---|---|---|
| 6,667,745 | B1 | 12/2003 | Hussain | |
| 6,732,067 | B1 * | 5/2004 | Powderly | G06F 13/105 703/24 |
| 6,847,370 | B2 * | 1/2005 | Baldwin | G09G 5/39 345/562 |
| 2003/0001853 | A1 * | 1/2003 | Obayashi | G09G 5/14 345/568 |
| 2003/0210248 | A1 | 11/2003 | Wyatt | |
| 2004/0231000 | A1 | 11/2004 | Gossalia et al. | |
| 2007/0153014 | A1 * | 7/2007 | Sabol | G06F 12/0846 345/557 |
| 2007/0162688 | A1 | 7/2007 | Okada et al. | |
| 2012/0081385 | A1 * | 4/2012 | Cote | H04N 5/23219 345/589 |

OTHER PUBLICATIONS

International Preliminary Report on Patentability for International Patent Application No. PCT/CN2011/084898, dated Jul. 10, 2014, 6 pages.

Non-Final Office Action for U.S. Appl. No. 13/977,200, dated Dec. 11, 2015, 38 pages.

Final Office Action for U.S. Appl. No. 13/977,200, dated May 25, 2016, 30 pages.

Notice of Allowance for U.S. Appl. No. 13/977,200, dated Jan. 17, 2017, 10 pages.

* cited by examiner

TRANSPOSE OF IMAGE DATA BETWEEN A LINEAR AND A Y-TILED STORAGE FORMAT

BACKGROUND

Currently there are two typical methods to do the cop between linear storage system memory and Y-tiled two dimensional (2D) surface storage in video memory. The first method uses the central processing unit (CPU) to do a copy, which typically favors a linear storage order. The second method uses the graphical processing unit (GPU) to do a copy, which typically favors a Y-tiled storage order.

For example, graphics hardware may often use Y-tiled 2D surface storage format in video memory for fast GPU access. Image data may be copied between system memory and Y-tiled surfaces in video memory.

BRIEF DESCRIPTION OF THE DRAWINGS

The material described herein is illustrated by way of example and not by way on limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
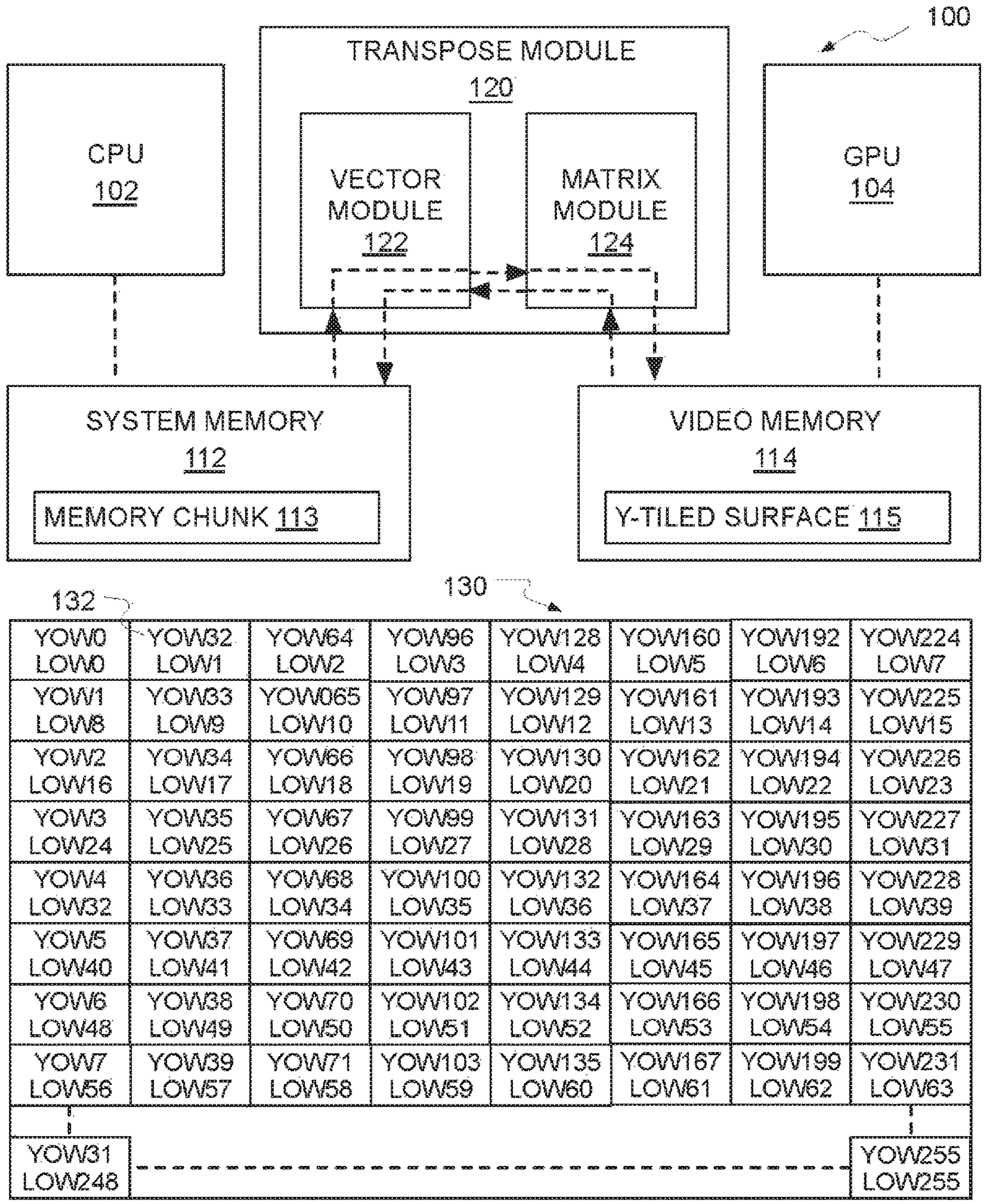
FIG. 1 is an illustrative diagram of an pie a graphics processing system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various, computing devices and/or consumer electronic (CE) devices such as set top boxes, smart phones, etc., may implement the techniques and/or arrangements described herein. Further, while the following description may set forth numerous specific details such as logic implementations, types and, interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure or characteristic is described in connection with an implementation, it is submitted that it is within the knowledge of one skilled in the art to effect such feature, structure, or characteristic in connection with other implementations whether or not explicitly described herein.

As will be described in greater detail below, some example implementation may include operations to transpose image data between a linear-type storage formal and a Y-tiled-type storage format. Additionally, a reading of the image data from a source memory may be in a pattern adapted for the particular storage format associated with the source memory. Similarly, a writing of the image data to a destination may be in a pattern adapted for the particular storage format associated with the destination memory.

FIG. 1 is an illustrative diagram of a graphics processing system 100, arranged in accordance with at least some implementations of the present disclosure. In the illustrated implementation, graphics processing system 100 may include a central processing unit (CPU) 102, a graphics processing unit (GPU) 102, a system memory 112, a video memory 114, and/or a transpose module 120.

In some examples, graphics processing system 100 may include additional items that have not been shown in FIG. 1 for the sake of clarity. For example, graphics processing system 100 may include a radio frequency-type (RF) transceiver, and/or an antenna. Further, graphics processing system 100 may include additional items such as a speaker, a display, an accelerometer, memory, a router, network interface logic, etc. that have not been shown in FIG. 1 for the sake of clarity.

In some examples, system memory 112 may be configured to store image data as a memory chunk 113 in, a linear-type storage format. Such a linear-type storage format may be suitable for usage by CPU 102. Similarly, video memory 114 may be configured to store image data as a Y-tiled surface 115 in a Y-tiled-type storage format. Such a Y-tiled-type storage format may be suitable for usage by GPU 104.

In some examples, transpose module 120 may include matrix module 122 and vector module 124. In operation, one of CPU 102 and GPU 104 may operate to read image data from video memory 114 and, write image data into system memory 112. Such a reading may include reading image data in a Y-tiled-type storage format via matrix module 124 (e.g., via a matrix pattern adapted for video memory 114). Similarly, such a writing of image data into system memory 112 may include writing image data in a linear-type storage format via vector module 122 (e.g., via a vector pattern adapted for system memory 112). Additionally or alternatively, similar operations may be performed in reverse to read image data from system memory 112 and write image data into video memory 114.

As illustrated, an image 130 may be stored in a Y-tiled-type storage format or in a linear-type storage format. The order of OWORDs 132 in FIG. 1 represents the storage order of the particular format (e.g., Y-tiled-type storage format represented by "Y"WORDs or linear-type storage format represented by "L"WORDs). For example, the same image data may be associated with the same grid location regardless of formatting, however, Y-tiled-type storage format calls for one access order, while linear-type storage format calls for another access order. For instance. Y-tiled-type storage format OWORDs (e.g., YOW0, YOW1, YOW2, YOW3, etc.) are organized in a columnar order, while linear-type storage format OWORDs (e.g., LOW0, LOW1 LOW2, LOW3, etc.) are organized in a row order.

For example, in a Y-tiled surface storage format, tiles may have a fixed 4 KB size and may be aligned to physical dynamic random access memory (DRAM) page boundaries A 4 KB tile may be subdivided into a 32-high by 8-wide array of OWORDs for Y-Major Tiles. For Y-tiled-type storage formats, the 41 KB tiles may be stored sequentially in memory in major order.

Figure 2:
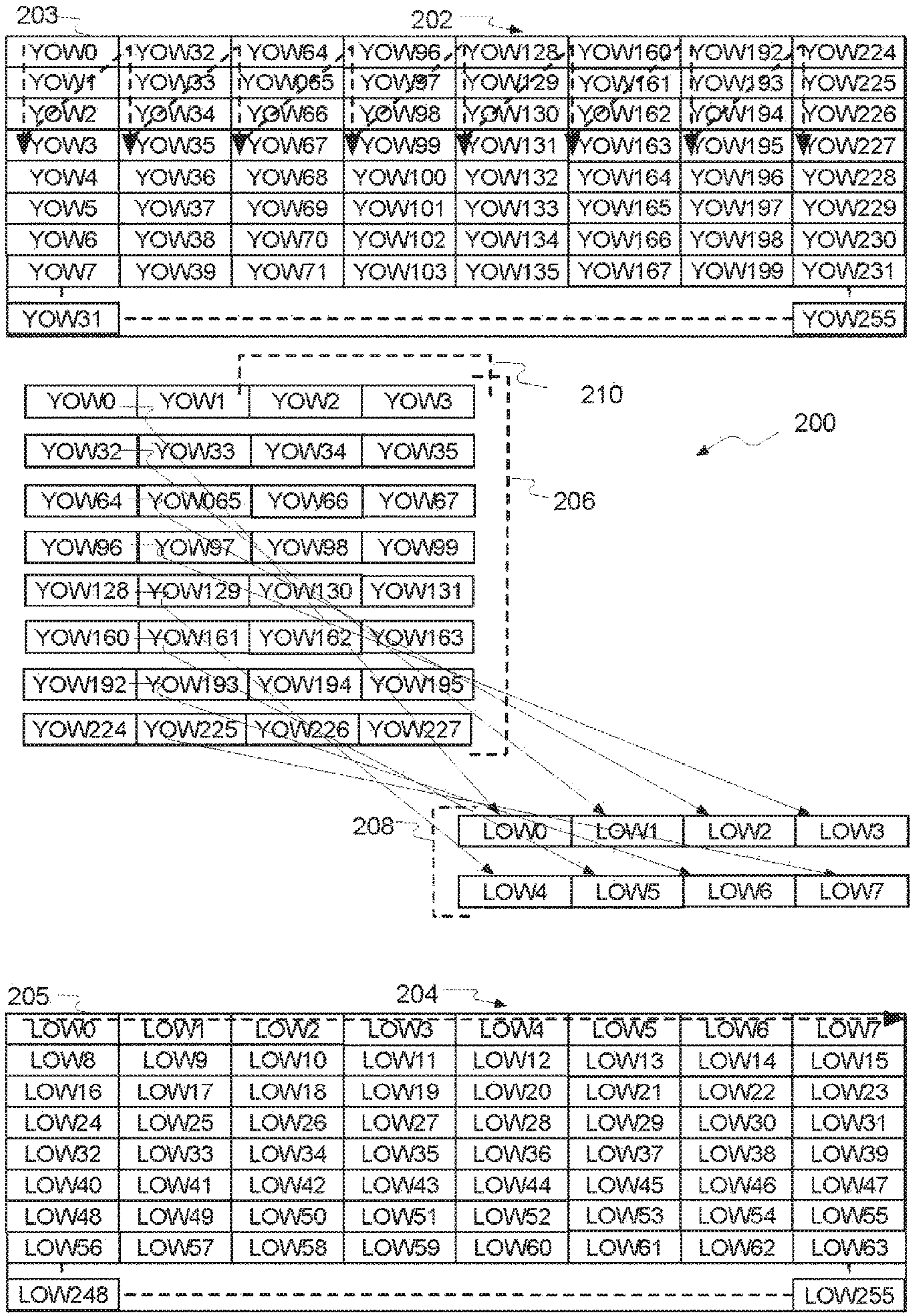
FIG. 2 is an illustrative diagram of an example transpose process.

FIG. 2 is an illustrative diagram of an example transpose process 200, arranged in accordance with at least some implementations of the present disclosure. In the illustrated implementation, process 200, via, a CPU (not shown ay copy from tiled to a linear storage format without, a transpose operation. The dotted line 203 indicates a CPU access order for copy of source memory 202. Similarly, the dotted line 205 indicates a CPU access order for writing to destination memory 204.

In operation, process 200 may operate with a Y-tiled-type storage format to cache-line (YOW0, YOW1, YOW2, YOW3)) from source memory 202. Similarly, process 200 may perform 8 total 64 byte cache accesses 206, e.g., cache-line (YOW0, YOW1, YOW2, YOW3), cache-line YOW32, YOW33, YOW34, YOW35) up to and including cache-line (YOW224, YOW225, YOW226, YOW227). At this point, process 200 may access the same image data for linear-type storage format to cache-line (LOW0, LOW1, LOW2, LOW3) for transfer to destination, memory 204. Similarly, process 200 may perform 2 total 64 byte cache-line accesses 208, e.g., cache-line (LOW0, LOW1, LOW2, LOW3) and cache-line (LOW4, LOW5, LOW6, LOW7).

In such an implementation, process 200 may operate so that on the source side, a portion 210 of each cache-line 206 is not used, resulting in substantial waste (e.g., seventy-five percent wasted and only twenty-five percent used).

Figure 3:
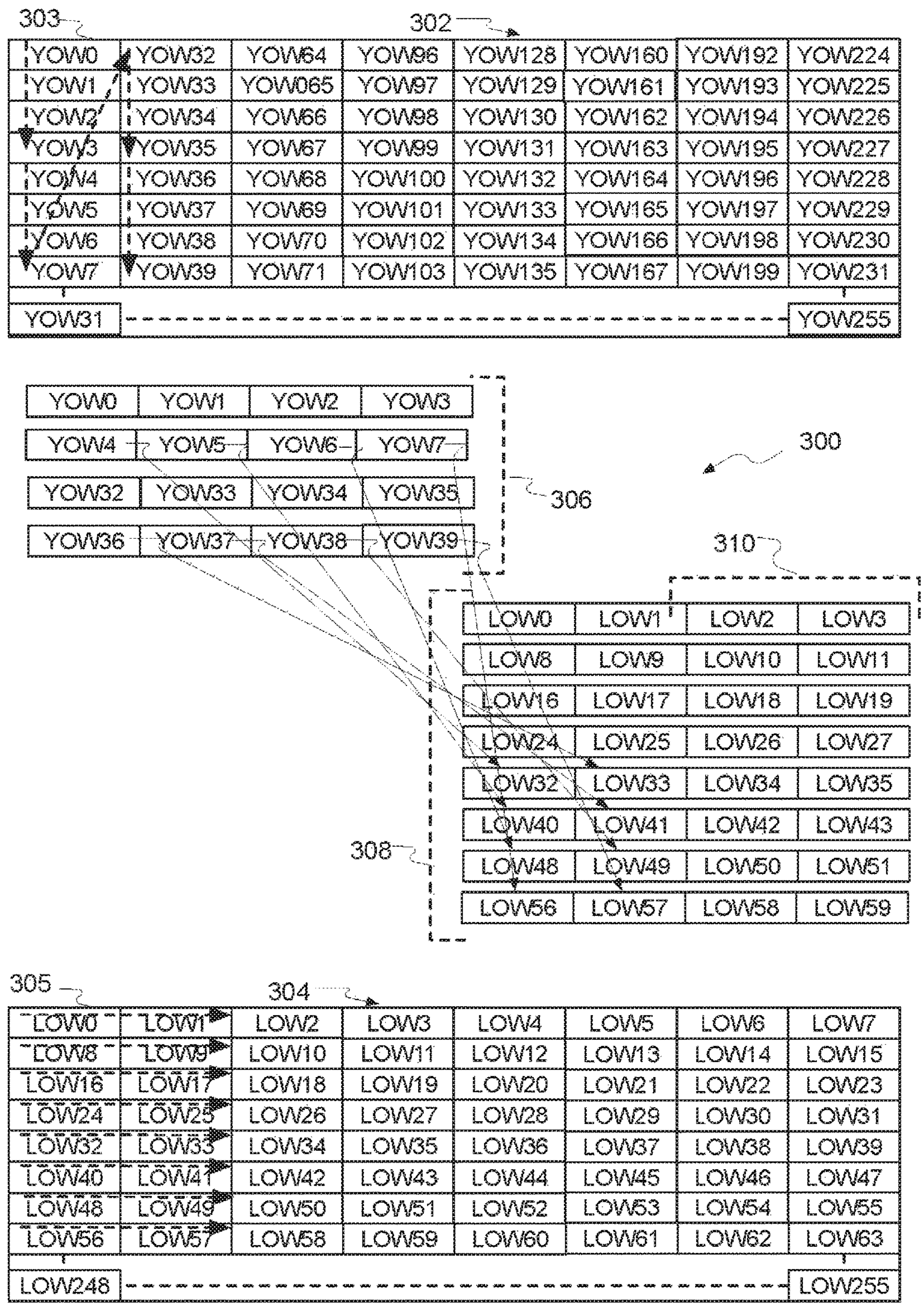
FIG. 3 is an illustrative diagram of another example transpose process.

FIG. 3 is an illustrative diagram of another ex ample transpose process 300, arranged in accordance with at least some implementations of the present disclosure. In the illustrated implementation, process 300, via a GPU (not shown) may copy from a Y-tiled to a linear storage format without a transpose operation. The dotted line 303 indicates a GPU access order for copy of source memory 302. Similarly, the dotted line 305 indicates a GPU access order for writing to destination memory 304.

In operation, process 300 may operate with Y-tiled-type storage format to cache-line (YOW0, YOW1, YOW2, YOW3) from source memory 302. Similarly, process 300 may perform 4 total 64 byte cache-line accesses 306. e.g., cache-line (YOW0, YOW1, YOW2, YOW3), cache-line (YOW4, YOW5, YOW6, YOW7) up to and including cache-line (YOW36, YOW37, YOW38, YOW39) At this point, process 300 may access the same image data for linear-type storage format to cache-line (LOW0, LOW1, LOW2, LOW3) for transfer to destination memory 304. Similarly, process 300 may perform 8 total 64 byte cache-line accesses 308, e.g., cache-line (LOW0, LOW1, LOW2, LOW3), cache-line (LOW8, LOW9, LOW10, LOW11) up to and including cache-line (LOW56, LOW57, LOW58, LOW59), each one twice.

In such an implementation, process 300 may operate so that on the destination side, a portion 310 of each cache-line 308 is not used, resulting in substantial waste (e.g., seventy-five percent wasted and only twenty-five percent used).

Figure 4:
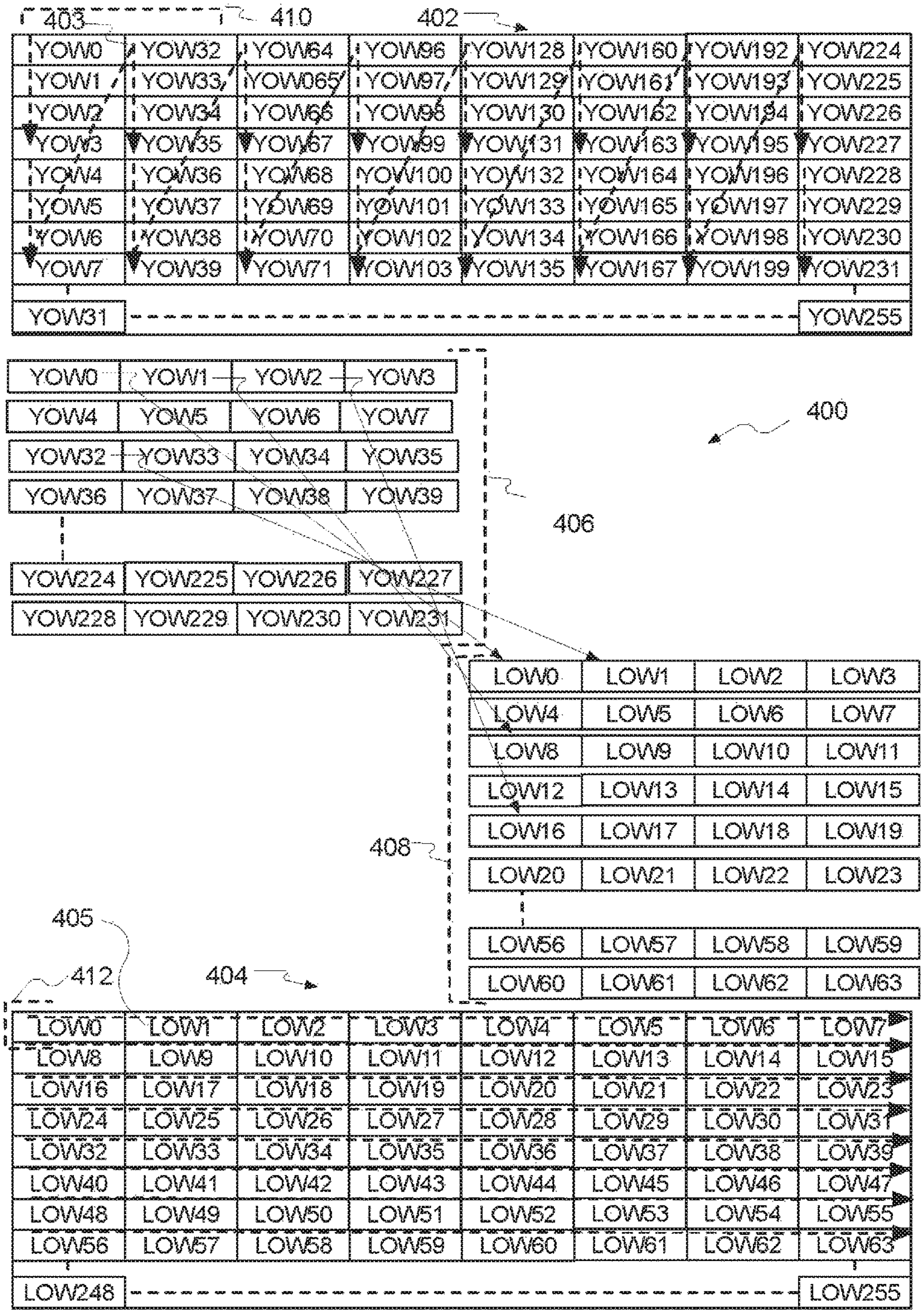
FIG. 4 is an illustrative diagram of a further example transpose process.

FIG. 4 is an illustrative diagram of a further example transpose process 400, arranged in accordance with at least implementations of the present disclosure. In the illustrated implementation, process 400 may include a reading or image data from a source memory 402 and a writing of image data into a destination memory 404. Such a reading may include reading image data in a Y-tiled-type storage format via a matrix pattern 403 adapted for source memory 402 (see, e.g., video memory 114 of FIG. 1). Such a writing of image data into destination memory 404 (see, e.g., system memory 112 of FIG. 1) may include writing image data in a linear-type storage format via a vector pattern 405 adapted for destination memory.

In such an implementation, the reading image data from source memory 402 may include reading image data four contiguous data blocks of source memory 402 into sixteen cache lines of cache 406. For example, each data block may include eight rows of thirty-two byte, of image data and is associated with matrix pattern 403. Additionally the transposing may include transposing matrix pattern 403 vector pattern 405 adapted for destination memory 404. Further, the writing image or data to destination memory 404 may include writing image data from the sixteen cache lines of cache 406 into eight contiguous data lines of destination memory 404, where each data line may include one row of one hundred and twenty-eight bytes of image data and is associated with vector pattern 405.

In the illustrated example, a GPU (not shown) may copy from to a Y-tiled to a linear storage format through use of transpose process 400. The dotted line 403 indicates GPU access order for copy of source memory 402. Similarly, the dotted line 405 indicates a GPU access order for writing to destination memory 404.

In operation, process 400 may operate with a Y-tiled-type storage format to cache-line (YOW0, YOW1, YOW2, YOW3) from source memory 402. Similarly, process 400 may perform 16 total 64 byte cache-line accesses 406, e.g., cache-line (YOW0, YOW1, YOW2, YOW3), cache-line (YOW4, YOW5, YOW6, YOW7) up to and including cache-line (YOW228, YOW229, YOW230, YOW231). At this point, transpose operations may be applied. After the transpose, process 400 may access the same image data via a linear-type storage format to cache-line (LOW0, LOW1, LOW2, LOW3) for transfer to destination memory 404. Similarly, process 400 may perform 16 total 64 byte cache-line accesses 408, e.g., cache-line (LOW0, LOW1, LOW2, LOW3), cache-line (LOW8, LOW9, LOW10, LOW11) up to and including cache-line (OW60, OW61, OW62, OW63). In such an implementation, process 400 may operate so that on both the source side and the destination side one hundred percent each ache-line is used, resulting in zero waste.

In one example, process 400 may transpose four CD-type (C-for-Media) matrix (e.g., where each matrix is of size 8*32 byte) into eight CM-type vectors (e.g., where each vector is of size 128 byte). In such an example, each tile in video memory may be divided into 16 data blocks (e.g., where each data block, is of size 8*32 byte), and each, data block may be read into one of the CM-type matrix (e.g., of size 8*32 byte) by using CM media block read. Four data blocks (e.g., four CM-type matrix) in a row may be of size 8*128 byte and can be represented as eight CM vectors) (e.g., 128 byte), These eight vectors may be written into cache (e.g., via CmBufferUP) by using a CM OWORD block write. Finally the four data blocks (e.g., four CM-type matrix) in the first row may be transposed into eight CM vectors)(e.g., of size 128 byte).

Below is one example of such a transpose algorithm. Since the CM matrix and CM vector may be stored in, registers the transpose between them may be very fast:

// 1st 32 BYTE of 1st vector (e.g., LOW0 and LOW1) is equal to 1st row of 1st matrix (e.g., YOW0 and YOW32); 2nd 32 BYTE of 1st vector (e.g.. LOW2 and LOW3 equal to 1st row of 2nd matrix (e.g., YOW64 and YOW96); 3rd 32 BYTE of 1st vector (e.g., LOW4 and LOW5) is equal to 1st row of 3$^{rd}$ matrix YOW128 and YOW160); 4th 32 BYTE of 1st vector (e.g., LOW6 and LOW7) is equal to 1st row of 4th matrix (e.g., YOW192 and YOW224): Vector0[0 . . . 31]=Matrix0[0]; Vector0[32 . . . 63]=Matrix1[0]; Vector0[64 . . . 95]=Matrix2[0]; Vector0[96 . . . 127]=Matrix3[0]; . . .

//1st 32 BYTE of 2nd vector (e.g., LOW8 and LOW9) equal to 2nd row of 1st matrix (e.g., YOW1 and YOW33); 2nd 32 BYTE of 2nd vector LOW10 and LOW11) to 2nd row of 2nd matrix (e.g., YOW65 and YOW97), 3rd 32 BYTE of 2nd vector LOW12 and LOW13) is equal to 2nd row of 3rd matrix (e.g., YOW129 and YOW161); 4th 32 BYTE of 2nd vector (e.g., LOW14 and LOW15) is equal to 2nd row of 4th matrix (e.g., YOW193 and YOW225); Vector1[0 . . . 31]=Matrix0[1]; Vector1[32. . . 63]=Matrix1 [1]; Vector1[64 . . . 95]=Matrix2[1]; Vector1[96 . . . 127]=Matrix3[1]; . . .

//1st 32 BYTE of 7th vector (e.g., LOW56 and LOW57) is equal to 7th row of 1st nt (e.g., YOW7 and YOW39); 2nd 32 BYTE of 7th vector (e.g. LOW58 and LOW59) is equal to 7$^{th}$ row of 2nd matrix (e.g., YOW71 and YOW103); 3rd 32 BYTE of 7th vector LOW60 and LOW61) is equal to 7th row of 3rd matrix (e.g., YOW135 and YOW167); 4th 32 BYTE of 7th vector . . . LOW62 and LOW63) is equal to 7th row of 4th matrix (e.g., YOW199 and YOW 231). Vector7[0 . . . 31]=Matrix0 [7]; Vector7[32 . . . 63]=Matrix1 [7]; Vector7[64 . . . 95]=Matrix2[7]; Vector7[96 . . . 127]=Matrix3[7]; etc.

In operation, each OWORD (e.g.. "Y"OWORD) may need to be brought into cache once on the video memory side. For example, in the video memory side one media block read may be used to read a data block of size 8*32 byte from the source (e.g., CmSurface2D) to a matrix (e.g., a CM matrix of sixe 8*32 byte). Using the top-left data block 410 as example, the data to real is YOW0, YOW1 . . . YOW7, YOW32, YOW33 . . . YOW39, for the first matrix 410. Since the order, here is the storage order, these data fit precisely into four 64-byte cache-lines 406. As a result, four data blocks fit precisely into 16 cache-lines 406.

Regarding the system memory side, one OWORD block orate may be used to write vector (e.g., a CM vector of size 128 byte) to the destination (e.g., CmBufferUP). Using the top vector 412 as example, the data to write as LOW0, LOW1, LOW2, LOW7. Since the order here is the storage order, these data fit precisely into two 64 BYTE cache-lines 408. As a result, eight vectors fit precisely into 16 cache-lines 408.

Experiments were performed to compare process 200 (see, e.g., FIG. 2 process 300 (see, e.g., FIG. 3), and process 400. As discussed above, process 400 introduces a transpose operation between the data read from a copy source and the data written to a copy destination. The source and destination may have different data storage format (e.g., one is Y-Tiled and the other is linear). The access pattern, which favors one storage for at, may not favor the other storage format. As a result, a direct copy without transpose (e.g., as illustrated in process 200 (see e.g., FIG. 2) and/or process 300 (see, e.g., FIG. 3)) may cause redundant data access. With process 400, data access in both the source and the destination can be in fit into cache-lines, eliminating the redundant data access.

The following set-ups were compared: a Streaming SIMD Extensions (SSE) accelerated CPU copy performing process 200 of FIG. 2, a normal GPU copy without transpose performing process 300 of FIG. 3, and a Sandy Bridge GT1-type processor performing process 400 of FIG. 4, each coping a high definition image of 1920*1290*RGBA (red green blue alpha) format. In experimentation, process 400 achieved 8.5 GB per second transfer ratio in both directions (e.g., a 17 GB per second bandwidth was achieved since each copy involves both read and write), which is very close to memory bandwidth limitation, of approximately 20 GB per second (e.g., for a 1333 Mhz double data rate type three synchronous dynamic random access memory (DDR3) 2-channel memory). Conversely, process 200 achieved a 2.4 GB per second transfer ratio. Similarly, process 300 achieved a 2.4 GB per second transfer ratio.

In another implementation (not illustrated), the reading image data from a source memory may include reading image data in linear-type storage format via a vector pattern adapted for source memory and the writing image data into destination memory may include writing image data in the Y-tiled-type storage format via the matrix pattern adapted for destination memory. In such an implementation, the reading of image data from source memory may include reading image data from eight contiguous data lines of source memory into sixteen cache lines of cache 406, where each data line may include one row of one hundred and twenty-eight bytes of image data and is associated re vector pattern. Additionally, the transposing may include transposing the sector pattern into a matrix pattern adapted for destination memory. Further, writing image data to destination memory comprises writing image data from the sixteen cache lines of cache into four contiguous data blocks of destination memory, wherein each data block comprises eight rows of thirty-two bytes of image data and is associated with the matrix pattern. The transpose process 400 for the copy in this opposite direction (e.g., from linear-type storage format to Y-tiled-type storage format) can be derived from the operations described above, in FIG. 4. Since in both the system memory side and the video, memory side all data access fit into cache-lines, redundant accesses are avoided.

In operation, process 400 may operate so that a plurality of cache line source accesses to cache 406 may be performed during the reading of image data from source memory 402. In such an example, all of the space associated with the cache line source accesses may be utilized during the writing of image data into destination memory 404. Additionally or alternatively, process 400 may operate so that a plurality of cache line destination accesses to cache 406 may be performed during the writing of image data into destination memory 404. In such an example, all of the space associated with the cache line destination accesses may be utilized during the writing image data into destination memory 404.

Some additional and/or alternative details related to process 400 may be illustrated in one or more examples of implementations discussed in greater detail below with regard to FIG. 5 and/or FIG. 6.

Figure 5:
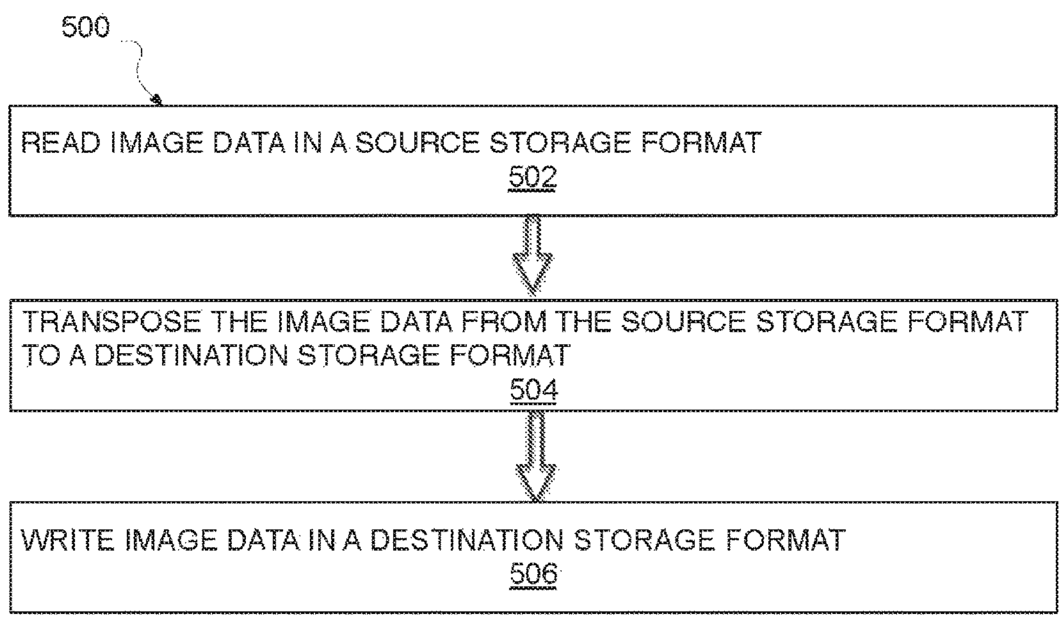
FIG. 5 is a flow chart illustrating an example transpose process.

FIG. 5 is a flow chart illustrating an example transpose process 500, arranged in accordance with at least some implementations of the present disclosure. In the illustrated implementation process 500 may include one or more operations, functions or actions as illustrated by one or more of blocks 502, 504, and/or 506. By way of non-limiting example, process 500 will be described herein with reference to example graphics processing system 100 of FIG. 1.

Process 500 may begin at block 502, "READ IMAGE DATA IN A SOURCE STORAGE FORMAT", where it age data may be read in a source storage format. For example, image data may be read from a source memory, where the source memory has, a source storage format. In some implementations, source memory may have a ear-type storage format. In other implementations source memory may have a Y-tiled-type storage format. As will be described in greater detail below, the reading of the source memory may be in a pattern adapted for the source memory.

Processing may continue from operation 502 to operation 504, "TRANSPOSE THE IMAGE DATA FROM THE SOURCE STORAGE FORMAT TO A DESTINATION STORAGE FORMAT", where the image data may be transposed from the source storage format to a destination storage format. For example, the image data may be transposed from the source storage format to the destination storage format different from the source storage format. In some implementations, one of the source storage format and the destination storage format may have a linear-type storage format and the other of the source storage format and the destination storage format may have a Y-tiled-type storage format.

Processing may continue from operation 504 to operation 506, "WRITE IMAGE DATA IN A DESTINATION STORAGE FORMAT", where the image data may be written into a destination memory. For example, the image data may be written into the destination me where the destination memory may have the destination storage format. As will be described in greater detail below, the writing of the destination memory may be in a pattern adapted for the destination memory.

Some additional and/or alternative details related to process ay be illustrated in one or more examples of implementations discussed in greater detail below with regard to FIG. 6.

Figure 6:
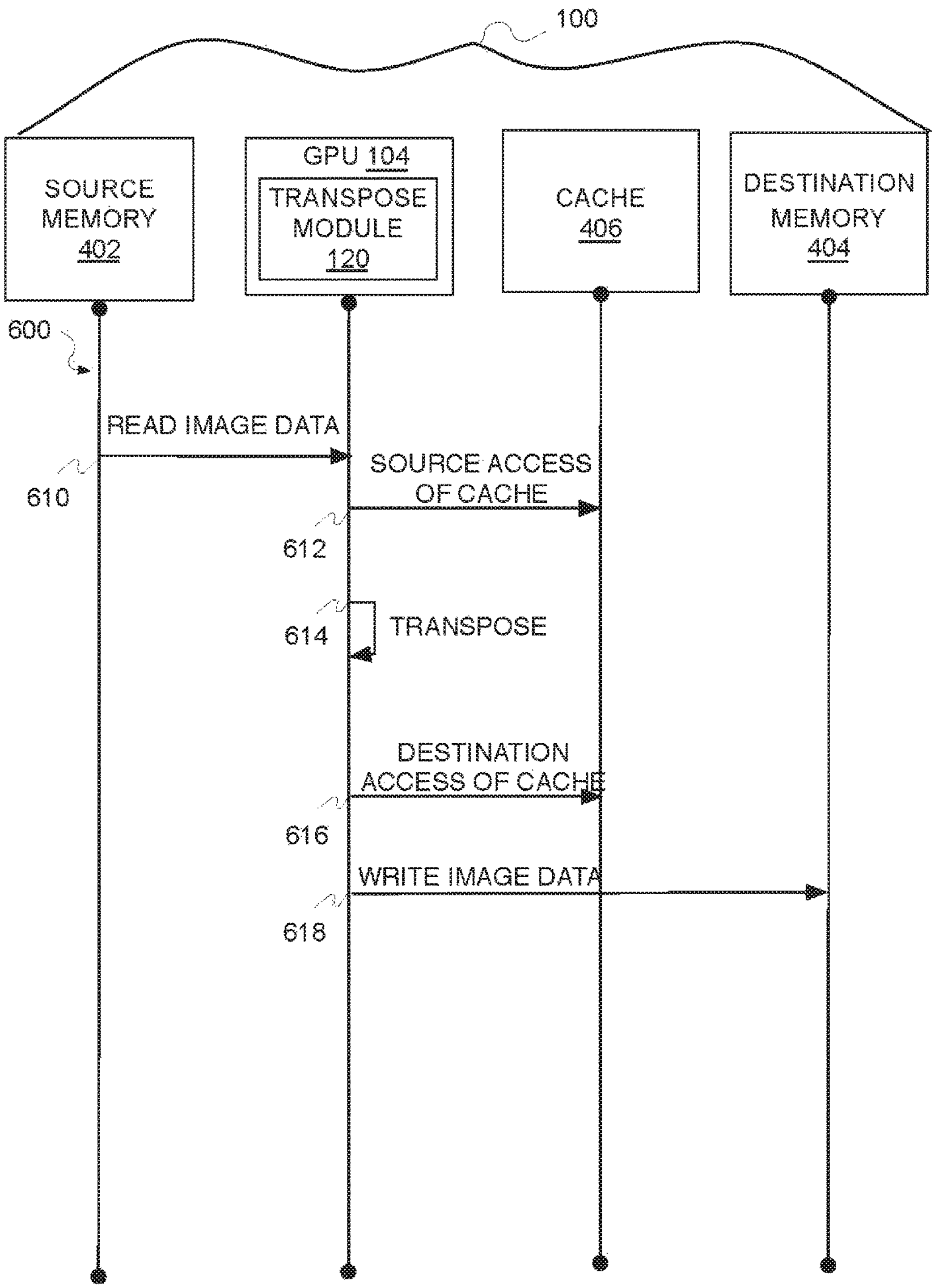
FIG. 6 is an illustrative diagram of an example graphics processing system in operation.

FIG. 6 is an illustrative diagram of example graphics processing system 100 and transpose process 600 in operation, arranged in accordance with at least some implementations of the present disclosure. In the illustrated implementation, process 600 may include one or more operations, functions or actions as illustrated by one or more of actions 610, 612, 614, 616, and/or 618. By way of non-limiting example, process 600 will be described herein with reference to example graphics processing system 100 of FIG. 1.

In the illustrated example, graphics processing system 100 may include CPU 104, transpose module 120, a source memory 402 (see, e.g., system memory 112 or video memory 114 of FIG. 1), a destination memory 404 (see, e.g., system memory 112 or video memory 114 of FIG. 1), a cache 406, and/or the like. As illustrated, CPU 104 may be capable of communication with source 402, destination memory 404, and/or cache 406. Although graphics processing system 100, as shown in FIG. 6, may include one particular set of blocks or actions associated with particular modules, these blocks or may be associated with different modules than the particular module illustrated here.

Process 600 may begin at block 610, "READ IMAGE DATA", there image data may be read in a source storage format. For example, image data may be read from source memory via GPU 104, where source memory 402 may have a source storage format. In some implementations, source memory 402 may have, a linear-type, storage format. In other implementations source memory 402 may have a Y-tiled-type storage format. As will be described in greater detail below, the reading of source memory 402 may be in a pattern adapted for source memory 402.

In one implementation, the reading of image data from source memory 402 may include reading image data in the Y-tiled-type storage format via a matrix pattern adapted for source memory 402.

In another implementation, the reading of image data from source memory 402 may include reading image data in linear-type storage format via a vector pattern adapted for so memory 402.

Process may continue from operation 610 to operation 612, "SOURCE ACCESS OF CACHE", where cache 406 may be accessed. For example, GPU 104 may access cache 406 to store image data read from source memory 402.

In one implementation, the reading image data from source memory 402 may include reading image data in the Y-tiled-type storage format via a matrix pattern adapted for source memory 402. In such an implementation, the reading image data from source memory 402 may include reading image data from four contiguous data blocks of source memory 402 into sixteen cache lines of cache 406, where each data block may include eight rows of thirty-two bytes of image data and is associated with the matrix pattern.

In another implementation, the reading of image data from source memory 402 may include reading image data, in linear-type storage format via a vector pattern adapted for source memory 402. In such an implementation, the reading of image data from source memory 402 may include reading image data from eight contiguous data lines of source memory 402 into sixteen cache lines of cache 406, where each data line may include one row of one hundred and twenty-eight bytes of image data and is associated with the vector pattern.

Processing may continue from operation 612 to operation 614, "TRANSPOSE", where the image data may be transposed from the source storage format to a destination storage format. For example, the image data may be transposed, via transpose module 120, from the source storage format to the destination storage format different from the source storage format. In some implementations, one of the source storage format and the destination storage format may have a linear-type storage format and the other of the source storage format an the destination storage format may have a Y-tiled-type storage format.

In one implementation, the reading image data from source memory 402 may include reading image data in the Y-tiled-type storage format via a matrix pattern adapted for source memory 402 and the writing of image data into destination memory 404 may include writing image data in the linear-type storage format. In such an implementation, the transposing may include transposing the matrix pattern into a vector pattern adapted for destination memory 404.

In another implementation, the reading of image data from source memory 402 may include reading image data in linear-type storage format via a vector pattern adapted for source memory 402. In such an implementation, the transposing may include transposing the vector pattern into a matrix pattern adapted for destination memory 404.

Processing may continue from operation 614 to operation 616, "DESTINATION ACCESS OF CACHE", where cache 406 may be accessed. For example, GPU 104 may access cache 406 to retrieve image data from cache 406 for writing to destination memory 404.

In one implementation, the reading image data from source memory 402 may include reading image data in the Y-tiled-type storage format via a matrix pattern adapted for source memory 402 and the writing of image data into destination memory 404 may include writing image data in the linear-type storage format via a vector pattern adapted for destination memory. In such an implementation, the writing image of data to destination memory 404 may include writing image data from the sixteen cache lines of cache 406 into eight contiguous data lines of destination memory 404, where each data line may include one row of one hundred and twenty-eight bytes of image data and, is associated, with the vector pattern.

In another implementation, the reading of image data from source memory 402 may include reading image data in linear-type storage format via a vector pattern adapted for source memory 402 and the writing image data into destination memory 404 may include writing image data in the Y-tiled-type storage format via the matrix pattern adapted for destination memory 404. In such an implementation, writing image data to destination memory 404 comprises writing image data from the sixteen cache lines of cache 406 into four contiguous data blocks of destination memory 404, wherein each data block comprises eight rows of thirty-two bytes of image data and is associated with the matrix pattern.

Processing may continue from operation 616 to operation 618, "WRITE IMAGE DATA", where the image data may be written into destination memory 404. For example the image data may be written into destination memory 404, via GPU 104, where destination memory 404 may have the destination storage format. As will be described in greater detail below, the writing of destination memory 404 may be in a pattern adapted for destination memory 404.

In one implementation, the reading image data from source memory 402 may include reading image data in the Y-tiled-type storage format via a matrix pattern adapted for source memory 402 and the writing of image data into destination memory 404 may include writing image data in the linear-type storage format via a vector pattern adapted for destination memory 404.

In another implementation the reading of image data from source memory 402 may include reading image data in linear-type storage format via a vector pattern adapted for source memory 402 and the writing image data into destination memory 404 may include writing image data in the Y-tiled-type storage format via the matrix pattern adapted for destination memory 404.

In some example implementations, source memory 402 and destination memory 404 may share the same physical storage device.

In operation, process 600 (and/or process 500 or 400) may operate so that a plurality of cache line source accesses to cache 406 may be performed during the reading of image data from source memory 402. In such an example, all of the space associated with the cache line source accesses may be utilized during the writing of image data into destination memory 404. Additionally or alternatively, process 600 (and/or process 500) may operate so that a plurality of cache line destination accesses to cache 406 may be performed during the writing of image data into destination memory 404. In such an example, all, of the space associated with the cache line destination accesses may be utilized during the writing of image data into destination memory 404. Additional details regarding such operations may be found in the discussion of FIG. 4 above.

In some implementations, a CM (C-for-Media) execution framework may be utilized to implement process 600 (and/or process 500 or 400). A CM application may have two components: kernel and host program. The kernel may be compiled of line by the CM compiler to produce an Intermediate Representation (IR) binary. The host program may call CM runtime application programming interface (API) to create input/output surfaces of the kernel, invoke the Just-In-Time compiler to obtain the Gen (e.g., Intel-brand GPU) binary, and pass it along with the kernel arguments specified by the application to the driver through CM runtime. The driver may prepare the command buffer and the batch buffer, and submit the command buffer and the batch buffer for GPU execution.

Such a CM kernel function may usually read from one or more input surfaces and write to one or more output surfaces. For example, CM typically supports 2D type surface (CmSurface2D) in video memory, which is of a Y-Tiled storage format. CM kernels may access CmSurface2D through a surface index and using a media block read/write. CM may also support a buffer type surface (CmBuffer) in video memory which may be of linear storage format. CM kernels may access CmBuffer through a surface index and using OWORD block read/write and DWORD scatter read/write.

Given the fact that video memory and system memory share the same physical memory graphics hardware, CM may also support, another type of buffer surface (CmBufferUP), which may be created upon user provided system memory. CmBufferUP and the corresponding system memory may actually be referring t the same physical memory. CmBufferUP may be accessed by the CM kernel through the surface index and using OWORD block read/write and DWORD scatter read/write. The corresponding system memory may be accessed by host program through a memory pointer. Given these two types of surfaces, a copy between Y-tiled 2D surface and system memory may be achieved using the GPU to copy between CmSurface2D and CmBufferUP. In some examples, process 600 (and/or process 500 or 400) may utilize a GPU 104 copy kernel, which may leverage a CM transpose function to get rid of the redundant access of image data. Such a GPU copy kernel may only need to access each OWORD once to copy the whole surface.

While implementation of example processes 500 and 600, as illustrated in FIGS. 5 and 6, may include the undertaking of all blocks shown in the order illustrated, the present disclosure is not limited in this regard and, in various examples, implement of processes 500 and 600 may include the undertaking only a subset of the blocks shown and/or in a different order than illustrated.

In addition, any one or more of the blocks of FIGS. 5 and 6 may be undertakers in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 7 and 8 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware" as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
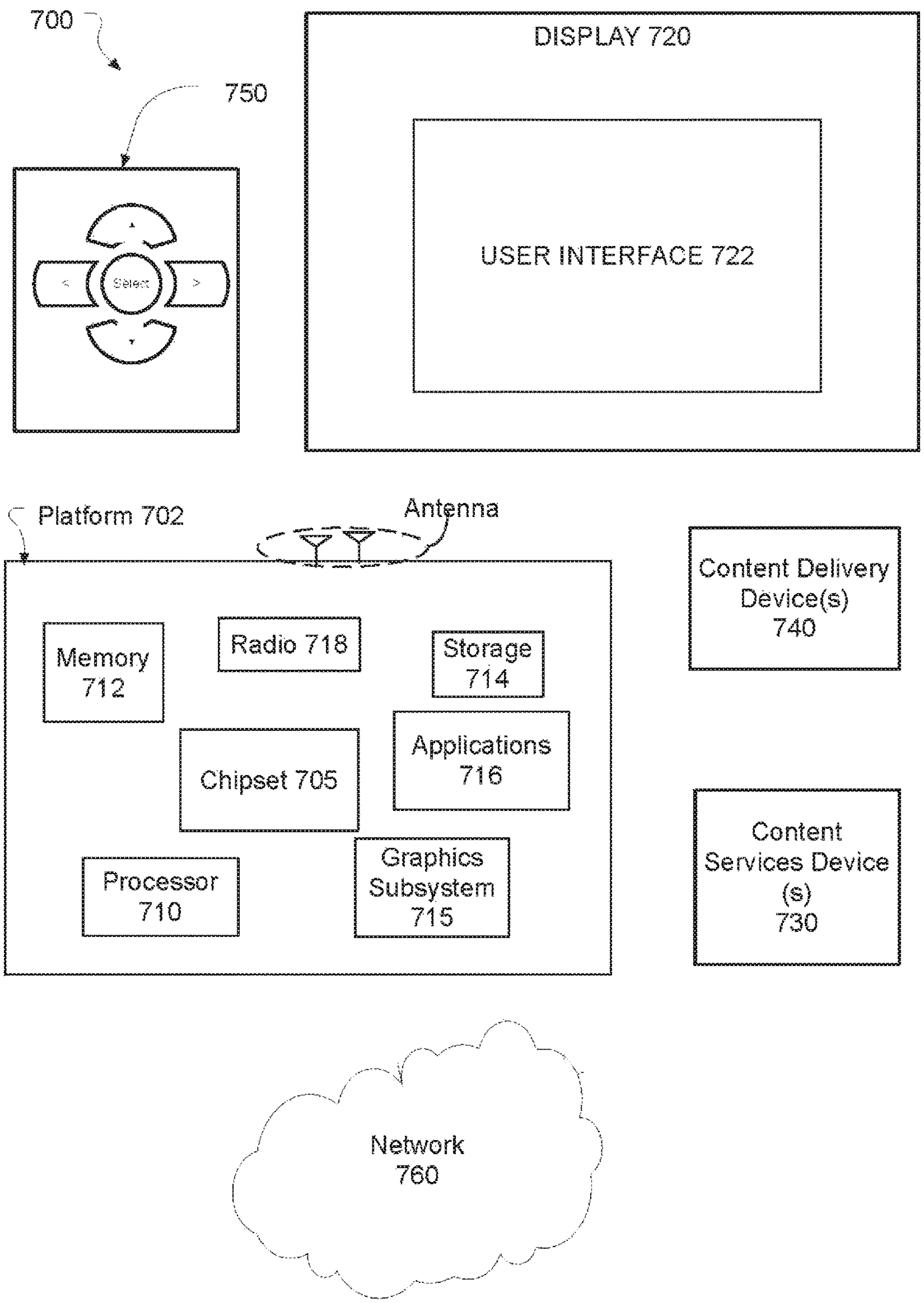
FIG. 7 is an illustrative diagram example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interact device (MID), messaging device, data communication device, and so forth.

In various implementations, system 700 includes a platform coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and, so forth.

Memory 712 may lie implemented as a volatile memory device such as, but not limited to, a Random Access Memory (RAM), Dynamic Random Access Memory (DRAM), or Static RAM (SRAM).

Storage 714 may be implemented as non-volatile storage device such as, but not limited to, a magnetic disk drive, optical disk drive, tape drive, an internal storage device, an a storage device, flash memory, battery backed-up SDRAM (synchronous DRAM), and/or a network accessible storage device. In various implementations, storage 714 may include technology to increase the storage performance enhanced protection valuable digital media when multiple hard drives are included, for example.

Graphics subsystem 715 may perform processing of images such as still or video for display. Graphics subsystem 715 may be a graphics processing unit (GPU), a Synergistic Processing Unit (SPU), or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated, into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing de ice that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 50 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations drivers (not shown) may include technology to enable users to instantly turn on and off platform 702 like a television the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for (5.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services, device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and, content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
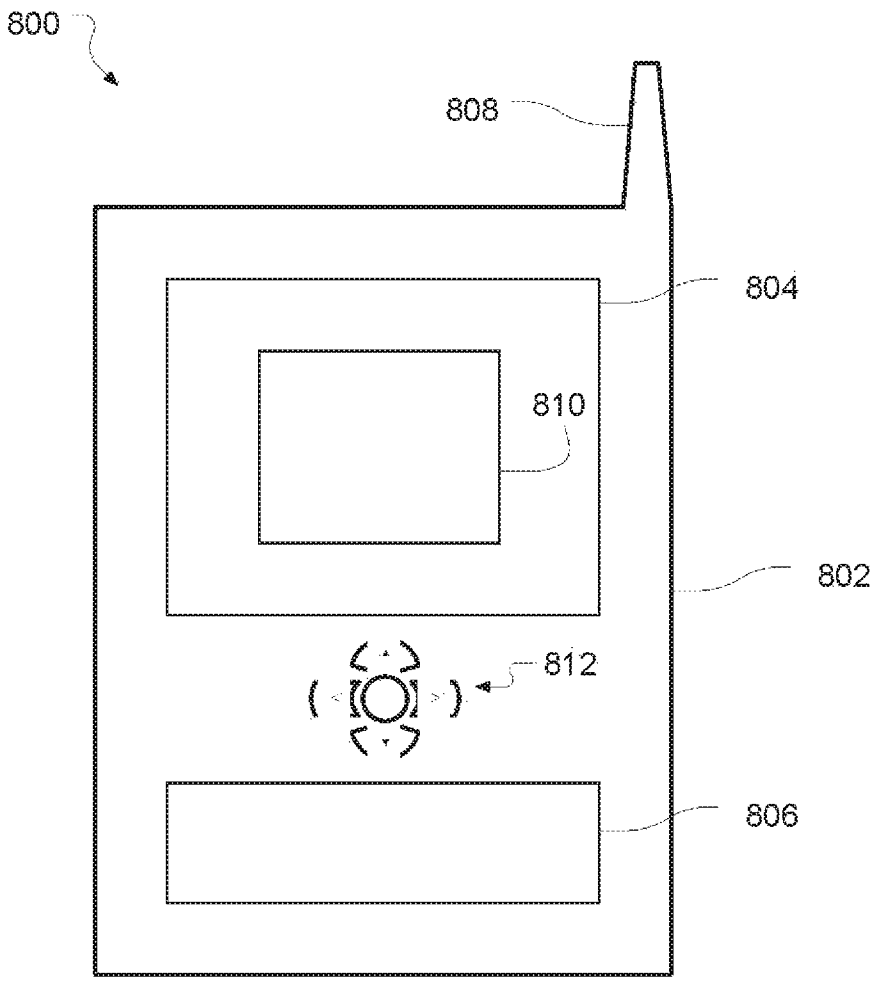
FIG. 8 is aft illustrative diagram of or a example system, all arranged in accordance at least some implementations of the present disclosure.

As described above, system 700 may be embodied in varying physical styles or form factors. FIG. 8 illustrates implementations of a small term factor device 800 in which system 700 may be embodied. In embodiments for example, device 800 may be implemented as a mobile computing device having wireless capabilities. A mobile computing device may refer to any device having a processing system and a mobile power source or supply, such as one or more batteries, for example.

As described above, examples of a mobile computing device may include personal computer (PC), laptop computer ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television) mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors resistors capacitors, inductors, and so forth), integrated circuits, application specific integrated circuits (ASIC), programmable logic devices (PLD), digital signal processors (DSP), field programmable gate array (FPGA), logic gates, registers, semiconductor device chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements, may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:

reading image data from a source memory, wherein the source memory has a source storage format, wherein the reading of the source memory is in a pattern adapted for the source memory;

transposing the image data from the source storage format to a destination storage format different from the source storage format, wherein one of the source storage format and the destination storage format have a linear-type storage format and the other of the source storage format and the destination storage format have a Y-tiled-type storage format; and writing image data into a destination memory, wherein the destination memory has the destination storage format, wherein the reading of the destination memory is in a pattern adapted for the destination memory;

wherein during the series of reading-transposing-writing operations on the image all of the space associated with a plurality of cache line source accesses is utilized without redundant accesses during the reading of image from the source memory and all of the space associated with a plurality of cache line destination accesses is utilized without redundant accesses during the writing of image data into the destination memory.

2. The method of claim 1, wherein reading image data from the source memory comprises reading image data in the Y-tiled-type storage format via a matrix pattern adapted for the source memory, wherein the transposing comprises transposing the matrix pattern into a vector pattern adapted for the destination memory, and wherein writing image data into the destination memory comprises writing image data in the linear-type storage format.

3. The method of claim 1, wherein reading image data from the source memory comprises reading image data in linear-type storage format via a vector pattern adapted for the source memory, wherein the transposing comprises transposing the vector pattern into a matrix pattern adapted for the destination memory, and wherein writing image data into the destination memory comprises writing image data in the Y-tiled-type storage format.

4. The method of claim 1, wherein reading image data from the source memory comprises reading image data from four contiguous data blocks of the source memory into sixteen cache lines, wherein each data block comprises eight rows of thirty-two bytes of image data and is associated with the matrix pattern, and wherein writing image data to the destination memory comprises writing image data from the sixteen cache lines into eight contiguous data lines of the destination memory, wherein each data line comprises one row of one hundred and twenty-eight bytes of image data and is associated with the vector pattern.

5. The method of claim 1, wherein reading image data from the source memory comprises reading image data from eight contiguous data lines of the source memory into sixteen cache lines, wherein each data line comprises one row of one hundred and twenty-eight bytes of image data and is associated with the vector pattern, and wherein writing image data to the destination memory comprises writing image data from the sixteen cache lines into four contiguous data blocks of the destination memory, wherein each data block comprises eight rows of thirty-two bytes of image data and is associated with the matrix pattern.

6. The method of claim 1, wherein the source memory and the destination memory may share the same physical storage device.

7. The method of claim 1, wherein a plurality of cache line source accesses are performed during the reading of image data from the source memory, wherein all of the space associated with the cache line source accesses is utilized during the writing of image data into the destination memory.

8. The method of claim 1, wherein a plurality of cache line destination accesses are performed during the writing of image data into the destination memory, and wherein all of the space associated with the cache line destination accesses is utilized during the writing of image data into the destination memory.

9. The method of claim 1, wherein reading image data from the source memory comprises reading image data in the Y-tiled-type storage format via a matrix pattern adapted for the source memory, wherein the transposing comprises transposing the matrix pattern into a vector pattern adapted for the destination memory, wherein writing image data into the destination memory comprises writing image data in the linear-type storage format, wherein reading image data from the source memory comprises reading image data from four contiguous data blocks of the source memory into sixteen cache lines, wherein each data block comprises eight rows of thirty-two bytes of image data and is associated with the matrix pattern, and wherein writing image data to the destination memory comprises writing image data from the sixteen cache lines into eight contiguous data lines of the destination memory, wherein each data line comprises one row of one hundred and twenty-eight bytes of image data and is associated with the vector pattern, wherein the source memory and the destination memory may share the same physical storage device, wherein a plurality of cache line source accesses are performed during the reading of image data from the source memory, wherein all of the space associated with the cache line source accesses is utilized during the writing of image data into the destination memory, and wherein a plurality of cache line destination accesses are performed during the writing of image data into the destination memory, and wherein all of the space associated with the cache line destination accesses is utilized during the writing of image data into the destination memory.

10. The method of claim 1, wherein reading image data from the source memory comprises reading image data in linear-type storage format via a vector pattern adapted for the source memory, wherein the transposing comprises transposing the vector pattern into a matrix pattern adapted for the destination memory, wherein writing image data into the destination memory comprises writing image data in the Y-tiled-type storage format, wherein reading image data from the source memory comprises reading image data from eight contiguous data lines of the source memory into sixteen cache lines, wherein each data line comprises one row of one hundred and twenty-eight bytes of image data and is associated with the vector pattern, wherein writing image data to the destination memory comprises writing image data from the sixteen cache lines into four contiguous data blocks of the destination memory, wherein each data block comprises eight rows of thirty-two bytes of image data and is associated with the matrix pattern, wherein the source memory and the destination memory may share the same physical storage device, wherein a plurality of cache line source accesses are performed during the reading of image data from the source memory, wherein all of the space associated with the cache line source accesses is utilized during the writing of image data into the destination memory, and wherein a plurality of cache line destination accesses are performed during the writing of image data into the destination memory, and wherein all of the space associated with the cache line destination accesses is utilized during the writing of image data into the destination memory.

11. At least one non-transitory machine readable medium comprising a plurality of instructions that in response to being executed on a computing device, cause the computing device to:

reading image data from a source memory, wherein the source memory has a source storage format, wherein the reading of the source memory is in a pattern adapted for the source memory;

transposing the image data from the source storage format to a destination storage format different from the source storage format, wherein one of the source storage format and the destination storage format have a linear-type storage format and the other of the source storage format and the destination storage format have a Y-tiled-type storage format; and writing image data into a destination memory, wherein the destination memory has the destination storage format, wherein the writing of the destination memory is in a pattern adapted for the destination memory;

wherein during the series of reading-transposing-writing operations on the image all of the space associated with a plurality of cache line source accesses is utilized without redundant accesses during the reading of image from the source memory and all of the space associated with a plurality of cache line destination accesses is utilized without redundant accesses during the writing of image data into the destination memory.

12. The non-transitory machine readable medium of claim 11, wherein reading image data from the source memory comprises reading image data in the Y-tiled-type storage format via a matrix pattern adapted for the source memory, wherein the transposing comprises transposing the matrix pattern into a vector pattern adapted for the destination memory, and wherein writing image data into the destination memory comprises writing image data in the linear-type storage format.

13. The non-transitory machine readable medium of claim 11, wherein reading image data from the source memory comprises reading image data in linear-type storage format via a vector pattern adapted for the source memory, wherein the transposing comprises transposing the vector pattern into a matrix pattern adapted for the destination memory, and wherein writing image data into the destination memory comprises writing image data in the Y-tiled-type storage format.

14. The non-transitory machine readable medium of claim 11, wherein reading image data from the source memory comprises reading image data from four contiguous data blocks of the source memory into sixteen cache lines, wherein each data block comprises eight rows of thirty-two bytes of image data and is associated with the matrix pattern, and wherein writing image data to the destination memory comprises writing image data from the sixteen cache lines into eight contiguous data lines of the destination memory, wherein each data line comprises one row of one hundred and twenty-eight bytes of image data and is associated with the vector pattern.

15. The non-transitory machine readable medium of claim 11, wherein reading image data from the source memory comprises reading image data from eight contiguous data lines of the source memory into sixteen cache lines, wherein each data line comprises one row of one hundred and twenty-eight bytes of image data and is associated with the vector pattern, and wherein writing image data to the destination memory comprises writing image data from the sixteen cache lines into four contiguous data blocks of the destination memory, wherein each data block comprises eight rows of thirty-two bytes of image data and is associated with the matrix pattern.

16. The non-transitory machine readable medium of claim 11, wherein a plurality of cache line source accesses are performed during the reading of image data from the source memory, wherein all of the space associated with the cache line source accesses is utilized during the writing of image data into the destination memory, and wherein a plurality of cache line destination accesses are performed during the writing of image data into the destination memory, and wherein all of the space associated with the cache line destination accesses is utilized during the writing of image data into the destination memory.

17. An apparatus, comprising:

a processor configured to:

read image data from a source memory, wherein the source memory has a source storage format, wherein the read of the source memory is in a pattern adapted for the source memory;

transpose the image data from the source storage format to a destination storage format different from the source storage format, wherein one of the source storage format and the destination storage format have a linear-type storage format and the other of the source storage format and the destination storage format have a Y-tiled-type storage format; and write image data into a destination memory, wherein the destination memory has the destination storage format, wherein the write of the destination memory is in a pattern adapted for the destination memory;

wherein during the series of reading-transposing-write operations on the image all of the space associated with a plurality of cache line source accesses is utilized without redundant accesses during the read of image from the source memory and all of the space associated with a plurality of cache line destination accesses is utilized without redundant accesses during the write of image data into the destination memory.

18. The apparatus of claim 17, wherein the read of image data from the source memory comprises a read of image data in the Y-tiled-type storage format via a matrix pattern adapted for the source memory, wherein the transpose comprises a transpose of the matrix pattern into a vector pattern adapted for the destination memory, and wherein the write of image data into the destination memory comprises a write of image data in the linear-type storage format.

19. The apparatus of claim 17, wherein the read of image data from the source memory comprises a read of image data in linear-type storage format via a vector pattern adapted for the source memory, wherein the transpose comprises a transpose of the vector pattern into a matrix pattern adapted for the destination memory, and wherein the write of image data into the destination memory comprises a write of image data in the Y-tiled-type storage format.

20. The apparatus of claim 17, wherein the read of image data from the source memory comprises a read of image data from four contiguous data blocks of the source memory into sixteen cache lines, wherein each data block comprises eight rows of thirty-two bytes of image data and is associated with the matrix pattern, and wherein the write of image data to the destination memory comprises a write of image data from the sixteen cache lines into eight contiguous data lines of the destination memory, wherein each data line comprises one row of one hundred and twenty-eight bytes of image data and is associated with the vector pattern.

21. The apparatus of claim 17, wherein the read of image data from the source memory comprises a read of image data from eight contiguous data lines of the source memory into sixteen cache lines, wherein each data line comprises one row of one hundred and twenty-eight bytes of image data and is associated with the vector pattern, and wherein the write of image data to the destination memory comprises a write of image data from the sixteen cache lines into four contiguous data blocks of the destination memory, wherein each data block comprises eight rows of thirty-two bytes of image data and is associated with the matrix pattern.

22. The apparatus of claim 17, wherein a plurality of cache line source accesses are performed during the read of image data from the source memory, wherein all of the space associated with the cache line source accesses is utilized during the write of image data into the destination memory, and wherein a plurality of cache line destination accesses are performed during the write of image data into the destination memory, and wherein all of the space associated with the cache line destination accesses is utilized during the write of image data into the destination memory.

23. A system comprising:

a display;

a processor, wherein the processor is communicatively coupled to the display, wherein the processor configured to:

read image data from a source memory, wherein the source memory has a source storage format, wherein the read of the source memory is in a pattern adapted for the source memory;

transpose the image data from the source storage format to a destination storage format different from the source storage format, wherein one of the source storage format and the destination storage format have a linear-type storage format and the other of the source storage format and the destination storage format have a Y-tiled-type storage format; and write image data into a destination memory, wherein the destination memory has the destination storage format, wherein the write of the destination memory is in a pattern adapted for the destination memory;

wherein during the series of reading-transposing-write operations on the image all of the space associated with a plurality of cache line source accesses is utilized without redundant accesses during the read of image from the source memory and all of the space associated with a plurality of cache line destination accesses is utilized without redundant accesses during the write of image data into the destination memory.

24. The system of claim 23, wherein the read of image data from the source memory comprises a read of image data in the Y-tiled-type storage format via a matrix pattern adapted for the source memory, wherein the transpose comprises a transpose of the matrix pattern into a vector pattern adapted for the destination memory, and wherein the write of image data into the destination memory comprises a write of image data in the linear-type storage format.

25. The system of claim 23, wherein the read of image data from the source memory comprises a read of image data in linear-type storage format via a vector pattern adapted for the source memory, wherein the transpose comprises a transpose of the vector pattern into a matrix pattern adapted for the destination memory, and wherein the write of image data into the destination memory comprises a write of image data in the Y-tiled-type storage format.

* * * * *